United States Patent
Tammana et al.

(10) Patent No.: US 10,981,160 B1
(45) Date of Patent: *Apr. 20, 2021

(54) COMPOSITE HIERARCHICAL ZEOLITE CATALYST FOR HEAVY REFORMATE CONVERSION TO XYLENES

(71) Applicant: Saudi Arabian Oil Company, Dhahran (SA)

(72) Inventors: Veera Venkata Ramakrishna Tammana, Ras Tanura (SA); Raed Hasan Abudawoud, Al-Khobar (SA); Ahmad A Jazzar, Riyadh (SA); Mohammed Al Amer, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,918

(22) Filed: Dec. 19, 2019

(51) Int. Cl.
| | |
|---|---|
| *B01J 29/04* | (2006.01) |
| *B01J 37/02* | (2006.01) |
| *B01J 6/00* | (2006.01) |
| *B01J 29/40* | (2006.01) |
| *B01J 29/72* | (2006.01) |
| *B01J 37/08* | (2006.01) |
| *B01J 29/44* | (2006.01) |
| *B01J 29/46* | (2006.01) |

(Continued)

(52) U.S. Cl.
CPC ............ *B01J 37/0201* (2013.01); *B01J 6/001* (2013.01); *B01J 29/041* (2013.01); *B01J 29/042* (2013.01); *B01J 29/043* (2013.01); *B01J 29/044* (2013.01); *B01J 29/045* (2013.01); *B01J 29/40* (2013.01); *B01J 29/44* (2013.01); *B01J 29/46* (2013.01); *B01J 29/48* (2013.01); *B01J 29/7269* (2013.01); *B01J 29/7469* (2013.01); *B01J 29/7669* (2013.01); *B01J 29/7869* (2013.01); *B01J 35/026* (2013.01); *B01J 35/109* (2013.01); *B01J 35/1038* (2013.01); *B01J 35/1057* (2013.01); *B01J 35/1061* (2013.01); *B01J 37/0009* (2013.01); *B01J 37/0213* (2013.01); *B01J 37/031* (2013.01); *B01J 37/08* (2013.01); *B01J 37/18* (2013.01); *B01J 2229/14* (2013.01); *B01J 2229/18* (2013.01); *B01J 2229/183* (2013.01); *B01J 2229/186* (2013.01); *B01J 2229/20* (2013.01); *B01J 2229/22* (2013.01); *B01J 2229/34* (2013.01); *B01J 2229/38* (2013.01); *B01J 2229/40* (2013.01)

(58) Field of Classification Search
CPC ...... B01J 29/041; B01J 29/042; B01J 29/043; B01J 29/044; B01J 29/045; B01J 29/44; B01J 29/46; B01J 29/48; B01J 29/7469; B01J 29/7669; B01J 29/7869; B01J 29/80; B01J 2229/18; B01J 2229/183; B01J 2229/186; B01J 2229/14; B01J 2229/22; B01J 2229/34; B01J 2229/40; B01J 2229/38; B01J 35/1038; B01J 35/1057; B01J 35/1061; B01J 35/026; B01J 35/109; B01J 37/18; B01J 37/0213; B01J 37/0018; B01J 37/08; B01J 37/0009; B01J 37/031; B01J 37/0201; B01J 29/7269; C01B 39/026; C10G 35/065; C10G 35/095; C10G 35/085; C10G 35/09
USPC ........ 502/60, 63, 64, 66, 67, 69, 71, 74, 76, 502/77, 78, 85; 423/702, 704, 709, 710, 423/716
See application file for complete search history.

(56) References Cited

U.S. PATENT DOCUMENTS

| | | | |
|---|---|---|---|
| 4,341,622 A | 7/1982 | Tabak et al. | |
| 4,861,739 A | 8/1989 | Pellet et al. | |

(Continued)

FOREIGN PATENT DOCUMENTS

| | | |
|---|---|---|
| CN | 103626655 A | 3/2014 |
| WO | 1996024568 A1 | 8/1996 |

(Continued)

OTHER PUBLICATIONS

Zhang et al., "Mesoporous Aluminosilicates with Ordered Hexagonal Structure, Strong Acidity, and Extraordinary Hydrothermal Stability at High Temperatures", J. Am. Chem. Soc. 123, 2001, pp. 5014-5021.*

(Continued)

*Primary Examiner* — Elizabeth D Wood
(74) *Attorney, Agent, or Firm* — Dinsmore & Shohl LLP

(57) ABSTRACT

A method of producing a hierarchical zeolite composite catalyst is provided. The method includes dissolving, in an alkaline solution and in the presence of a surfactant, a catalyst precursor comprising mesoporous zeolite to yield a dissolved zeolite solution, where the mesoporous zeolite comprises large pore ZSM-12 and medium pore ZSM-5. The method also includes condensing the dissolved zeolite solution to yield a solid zeolite composite from the dissolved zeolite solution and heating the solid zeolite composite to remove the surfactant. The method further includes impregnating the solid zeolite composite with one or more active metals selected from the group consisting of platinum, rhenium, rhodium, molybdenum, nickel, tungsten, chromium, ruthenium, gold, and combinations thereof to yield impregnated solid zeolite composite and calcining the impregnated solid zeolite composite to produce the hierarchical zeolite composite catalyst. The hierarchical zeolite composite catalyst has a mesostructure comprising at least one disordered mesophase and at least one ordered mesophase.

13 Claims, 6 Drawing Sheets

(51) Int. Cl.
  *B01J 29/78* (2006.01)
  *B01J 29/76* (2006.01)
  *B01J 29/48* (2006.01)
  *B01J 29/74* (2006.01)
  *B01J 37/03* (2006.01)
  *B01J 37/00* (2006.01)
  *B01J 37/18* (2006.01)
  *B01J 35/10* (2006.01)
  *B01J 35/02* (2006.01)

(56) References Cited

U.S. PATENT DOCUMENTS

| | | | |
|---|---|---|---|
| 5,763,720 A | | 6/1998 | Buchanan et al. |
| 5,942,651 A | | 8/1999 | Beech, Jr. et al. |
| 6,558,647 B2 | | 5/2003 | Lacombe et al. |
| 6,793,911 B2 | * | 9/2004 | Koegler .......... C01B 39/04 |
| | | | 423/716 |
| 6,972,348 B2 | | 12/2005 | Negiz et al. |
| 7,154,041 B2 | | 12/2006 | Payne et al. |
| 7,220,885 B2 | | 5/2007 | Boldingh et al. |
| 7,393,989 B2 | | 7/2008 | Negiz et al. |
| 7,589,041 B2 | | 9/2009 | Ying et al. |
| 7,799,961 B2 | | 9/2010 | Clark et al. |
| 7,803,977 B2 | | 9/2010 | Riley et al. |
| 7,807,132 B2 | | 10/2010 | Garcia-Martinez |
| 7,919,421 B2 | | 4/2011 | Kalyanaraman et al. |
| 7,951,986 B2 | | 5/2011 | Clark et al. |
| 7,976,696 B2 | | 7/2011 | Ying et al. |
| 8,071,828 B2 | | 12/2011 | Cao et al. |
| 8,329,973 B2 | | 12/2012 | Inui et al. |
| 8,435,909 B2 | | 5/2013 | Al-Khattaf et al. |
| 8,653,315 B2 | | 2/2014 | Ali |
| 8,697,593 B2 | | 4/2014 | Al-Khattaf et al. |
| 8,821,714 B2 | | 9/2014 | Chaumonnot et al. |
| 9,221,037 B2 | | 12/2015 | Ercan et al. |
| 9,376,324 B2 | | 6/2016 | Senderov et al. |
| 9,403,690 B2 | | 8/2016 | Kim et al. |
| 9,573,121 B2 | | 2/2017 | Garcia-Martinez |
| 9,580,328 B2 | | 2/2017 | Martinez et al. |
| 9,718,050 B2 | | 8/2017 | Bonduelle et al. |
| 9,724,680 B2 | | 8/2017 | Lai et al. |
| 9,963,349 B2 | | 5/2018 | Boorse et al. |
| 10,077,220 B2 | | 9/2018 | Molinier et al. |
| 10,118,163 B1 | | 11/2018 | Zhang |
| 10,266,416 B2 | | 4/2019 | Kegnæs et al. |
| 10,350,585 B1 | | 7/2019 | Al-Herz et al. |
| 10,391,480 B2 | | 8/2019 | Zhang et al. |
| 2002/0018747 A1 | * | 2/2002 | Pinnavaia ............ C10G 47/16 |
| | | | 423/702 |
| 2004/0138051 A1 | | 7/2004 | Shan et al. |
| 2005/0075524 A1 | | 4/2005 | Feng et al. |
| 2005/0234279 A1 | | 10/2005 | Serra et al. |
| 2005/0239634 A1 | * | 10/2005 | Ying .......... C10G 47/02 |
| | | | 502/64 |
| 2007/0227351 A1 | * | 10/2007 | Garcia-Martinez ........................ |
| | | | C01B 39/023 |
| | | | 95/90 |
| 2007/0244347 A1 | * | 10/2007 | Ying .......... B82Y 30/00 |
| | | | 585/17 |
| 2008/0138274 A1 | * | 6/2008 | Garcia-Martinez .... B01J 29/084 |
| | | | 423/711 |
| 2008/0214882 A1 | | 9/2008 | Pinnavaia et al. |
| 2009/0005236 A1 | * | 1/2009 | Ying .......... C10G 1/086 |
| | | | 502/77 |
| 2009/0090657 A1 | * | 4/2009 | Ying .......... C10G 1/086 |
| | | | 208/300 |
| 2009/0326177 A1 | * | 12/2009 | Ying .......... C10G 11/18 |
| | | | 526/194 |
| 2010/0092383 A1 | * | 4/2010 | Ying .......... B01J 29/084 |
| | | | 423/718 |
| 2011/0118107 A1 | | 5/2011 | Garcia-Martinez et al. |
| 2011/0171121 A1 | * | 7/2011 | Senderov .......... C01B 39/026 |
| | | | 423/704 |
| 2011/0201860 A1 | | 8/2011 | Akhtar et al. |
| 2012/0024776 A1 | * | 2/2012 | Garcia-Martinez ...... B01J 20/18 |
| | | | 210/500.25 |
| 2012/0258852 A1 | | 10/2012 | Martinez et al. |
| 2013/0090507 A1 | | 4/2013 | Ali |
| 2013/0165315 A1 | | 6/2013 | Al-Khattaf et al. |
| 2013/0281750 A1 | | 10/2013 | Abudawoud |
| 2013/0292300 A1 | * | 11/2013 | Ying .......... B01J 29/005 |
| | | | 208/97 |
| 2013/0299389 A1 | * | 11/2013 | Garcia-Martinez .... B01J 29/084 |
| | | | 208/113 |
| 2014/0128246 A1 | | 5/2014 | Garcia-Martinez |
| 2015/0086786 A1 | | 3/2015 | Itabashi et al. |
| 2015/0182953 A1 | * | 7/2015 | Senderov .......... B01J 29/0308 |
| | | | 423/714 |
| 2016/0136625 A1 | | 5/2016 | Haw et al. |
| 2016/0220987 A1 | | 8/2016 | Lai et al. |
| 2016/0221897 A1 | | 8/2016 | Elia et al. |
| 2017/0157598 A1 | | 6/2017 | Chal et al. |
| 2017/0190587 A1 | | 7/2017 | Li et al. |
| 2018/0185827 A1 | | 7/2018 | Cheng et al. |
| 2018/0361365 A1 | | 12/2018 | Jermy et al. |
| 2018/0361372 A1 | | 12/2018 | Tammana et al. |

FOREIGN PATENT DOCUMENTS

| | | |
|---|---|---|
| WO | 2006070073 A1 | 7/2006 |
| WO | 2011047528 A1 | 4/2011 |
| WO | 2013123299 A1 | 8/2013 |
| WO | 2013151689 A1 | 10/2013 |
| WO | 2013154086 A1 | 10/2013 |
| WO | 2017060464 A1 | 4/2017 |

OTHER PUBLICATIONS

Soler-Illia et al., "Chemical Strategies to Design Textured Materials: From Microporous and Mesoporous Oxides to Nanonetworks and Hierarchical Structures", Chem. Rev. 102, 2002, pp. 4093-4138.*
Corma et al. "From Microporous to Mesoporous Molecular Sieve Materials and Their Use in Catalysis", Chem. Rev. 97, 1997, pp. 2373-2419.*
Karlsson et al., "Composites of micro- and mesoporous materials: simultaneous syntheses of MFI/MCM-41 like phases by a mixed template approach", Microporous and Mesoporous Mateirals, 27, 1999, pp. 181-192.*
Liu et al., "Aluminosilicate mesostructures with improved acidity and hydrothermal stability", J. Mater. Chem., 12, 2002, pp. 3179-3190.*
Goto et al., "Mesoporous Material from Zeolite", Journal of Porous Materials, 9, 2002, pp. 43-48.*
Groen et al., "On the introduction of intracrystalline mesoporosity in zeolites upon desilication in alkaline medium", Microporous and Mesoporous Materials, 69, 2004, pp. 29-34.*
Ogura et al., "Formation of Uniform Mesopores in ZSM-5 Zeolite through Treatment in Alkaline Solution", Chemistry Letters, 2000, pp. 882-883.*
Jacobsen et al., "Mesoporous Zeolite Single Crystals", J. Am. Chem. Soc., 122, 2000, pp. 7116-7117.*
Perez-Ramirez, "Tailored Mesoporosity Development in Zeolite Crystals by Partial Detemplation and Desilication", Adv. Funct. Mater. 19, 2009, pp. 164-172.*
Lidiane Sabino da Silva et al., "Desilication of ZSM-5 and ZSM-12 Zeolites with Different Crystal Sizes: Effect on Acidity and Mesoporous Initiation", Materials Research, 2019, 22(2), pp. 1-9.*
Gopal et al. "Synthesis of Al-rich ZSM-12 using TEAOH as template" Micorporous and Mesoporous Materials 49 (2001) 149-156, 8 pgs.
Huang, L. et al. "Investigation of Synthesizing MCM-41/ZSM-5 Composites" J. Phys. Chem. B. 104, 2817-2823 (2000), (Year: 2000).
Office Action dated Oct. 16, 2019 pertaining to U.S. Appl. No. 15/624,090, filed Jun. 15, 2017, 27 pgs.
Office Action dated Mar. 5, 2019 pertaining to U.S. Appl. No. 15/624,090, filed Jun. 15, 2017, 16 pgs.

(56) References Cited

OTHER PUBLICATIONS

Zhang, H et al., "Preparation and characterization of Beta/MCM-41 composite zeolite with a stepwise-distributed pore structure" Powder Technology, Nov. 21, 2007, pp. 73-78, vol. 183, No. 1, Elsevier Sequoia, CH.

Xu, H et al., "Synthesis of Beta/MCM-41 composite molecular sieve with high hydrothermal stability in static and stirred condition" Journal of Colloid and Interface Science, Jan. 15, 2009, pp. 346-350, vol. 329, No. 2, Academic Press, Inc., US.

International Search Report and Written Opinion pertaining to International Application No. PCT/US2018/036269 dated Nov. 12, 2018.

International Search Report and Written Opinion pertaining to International Application No. PCT/US2018/028798 dated Sep. 19, 2018.

Li, et al., "Synthesis of hierarchical mesoporous zeolites based on MOR zeolite: application in the automobile tailpipe hydrocarbon trap", Journal of Porous Materials, vol. 22, No. 3, Apr. 2, 2015, pp. 807-815, Netherlands.

Odedairo et al. "Aromatic transformations over aluminosilicate micro/mesoporous composite materials", Catalysis Science & Technology, vol. 2, No. 6, Jan. 1, 2012, pp. 1275-1286, United Kingdom.

Notice of Allowance dated Feb. 4, 2020 pertaining to U.S. Appl. No. 15/624,090, filed Jun. 15, 2017, 9 pgs.

Office Action dated May 7, 2020 pertaining to U.S. Appl. No. 15/958,394, filed Apr. 20, 2018, 48 pgs.

International Search Report and Written Opiniion dated Jul. 29, 2020 pertaining to International application No. PCT/US2020/026168 filed Apr. 1, 2020, 14 pgs.

Office Action dated Oct. 20, 2020 pertaining to U.S. Appl. No. 15/958,394, filed Apr. 20, 2018, 20 pgs.

\* cited by examiner

COMPOSITE HIERARCHICAL ZEOLITE CATALYST FOR HEAVY REFORMATE CONVERSION TO XYLENES

BACKGROUND

Technical Field

Embodiments of the present specification generally relate to zeolite composite catalysts, and specifically relate to zeolite composite catalysts and methods of using the same to convert heavy reformate to xylenes.

Technical Background

Aromatic hydrocarbon compounds derived from petrochemical sources, benzene ($C_6H_6$), toluene (methylbenzene, $C_7H_8$), and xylenes (dimethylbenzenes, $C_8H_{10}$ isomers) may be used as starting materials for a wide range of consumer products. The xylenes include three isomers of dimethylbenzene, namely: 1,2-dimethylbenzene (orthoxylene or o-xylene), 1,3-dimethylbenzene (meta-xylene or m-xylene), and 1,4-dimethylbenzene (para-xylene or p-xylene). The three isomers of xylene may be used in the synthesis of a number of useful products. For example, upon oxidation, the p-xylene isomer yields terephthalic acid, which may be used in the manufacture of polyester plastics and synthetic textile fibers (such as Dacron®), films (such as Mylar®), and resins (such as polyethylene terephthalate, used in making plastic bottles). The m-xylene isomer may be used in the manufacture of plasticizers, azo dyes, and wood preservers, for example. The o-xylene isomer may be used as a feedstock for phthalic anhydride production, which in turn may be used to make polyesters, alkyl resins, and PVC plasticizers. Therefore, the demand for xylenes remains strong as markets for polyester fibers and polyethylene terephthalate continue to demonstrate high growth rates.

Typically, heavy reformate contains 90 weight (wt.) % to 95 wt. % $C_9$ and 5 wt. % to 10 wt. % $C_{10}$ aromatic compounds. Among the $C_9$ components, trimethylbenzenes (TMBs) (50 wt. % to 60 wt. %) and methylethylbenzenes (MEBs) (30 wt. % to 40 wt. %) are the major constituents. One of the economically viable options is to convert the heavy aromatics in the heavy reformate into valuable products, such as xylenes. Demand is growing faster for xylene derivatives than for benzene derivatives. Therefore, a higher yield of xylenes at the expense of benzene yield is a favorable objective.

Heavy reformate can be subjected to transalkylation either alone or with toluene ($C_7$) for the production of xylenes ($C_8$) and benzene ($C_6$). Because many different compounds may be present in the heavy reformate, multiple parallel and consecutive reactions may take place. Transalkylation reactions for converting aromatic hydrocarbon compounds to compounds having a different number of carbon atoms may include the disproportionation reaction of toluene, which is two molecules of toluene reacting to form one molecule of benzene and one molecule of xylene (by transfer of a methyl group from one molecule of toluene to the other, a transalkylation reaction). Transalkylation reactions, however, are not limited to the disproportionation of toluene. Other methods of increasing xylene yields operate through inducing transalkylation by adding aromatic hydrocarbon compounds having nine or more carbon atoms into the starting materials, resulting in such reactions as the addition of one mole of toluene to one mole of a $C_9$ aromatic hydrocarbon to produce two moles of xylene. These parallel and consecutive reaction methodologies may also be accompanied by multiple chemical equilibria, including isomerization of xylenes, TMBs (trimethylbeneze), and MEBs (methylethylbenzene). The transalkylation and disproportionation reactions are equilibrium constrained, while the dealkylation reactions are kinetically controlled.

Regardless, these conventional means to produce xylenes by fractionation of reformate results in a xylene yield that is insufficient to meet the demand, and conversion of other hydrocarbons is necessary to increase the yield of xylenes. Furthermore, xylene isomer streams from catalytic reforming or other sources do not meet the demand as chemical intermediates. Para-xylene in particular is a major chemical intermediate with rapidly growing demand, but equates to only 20% to 25% of a typical $C_8$ aromatics stream.

SUMMARY

Accordingly, ongoing needs exist for catalysts suitable for converting heavy reformates to produce xylenes. Embodiments of the present disclosure are related to heretical zeolite catalysts, their preparation methods and performance, particularly to the synthesis of such catalysts having an ordered/disordered mesostructure and hydrothermal stability. The zeolite composite catalysts may convert a mixture of heavy aromatic compounds (such as those present in heavy reformate), particularly $C_9$ aromatic hydrocarbons, to benzene, toluene, and xylenes, and particularly to commercially valuable xylenes. The conversion reactions include dealkylation, transalkylation, disproportionation, and isomerization. The zeolite composite catalysts have a high ethyl-dealkylation activity as well as high methyl-transalkylation activity to improve the yield of xylenes.

According to one embodiment, a method of producing a hierarchical zeolite composite catalyst is provided. The method comprises dissolving, in an alkaline solution and in the presence of a surfactant, a catalyst precursor comprising mesoporous zeolite while heating, stirring, or both to yield a dissolved zeolite solution, where the mesoporous zeolite comprises large pore ZSM-12 having a $SiO_2/Al_2O_3$ ratio of 20 to 300 and medium pore ZSM-5 having a $SiO_2/Al_2O_3$ ratio of 5 to 500, where a ratio of ZSM-12 to ZSM-5 is 1:1 to 5:1 by weight. The method further comprises condensing the dissolved zeolite solution to yield a solid zeolite composite from the dissolved zeolite solution, where condensing the dissolved zeolite solution comprises adjusting a pH of the dissolved zeolite solution and aging the pH adjusted dissolved zeolite solution. The method yet further comprises heating the solid zeolite composite to remove the surfactant; impregnating the solid zeolite composite with one or more active metals selected from the group consisting of platinum, rhenium, rhodium, molybdenum, nickel, tungsten, chromium, ruthenium, gold, and combinations thereof to yield impregnated solid zeolite composite; and calcining the impregnated solid zeolite composite to produce the hierarchical zeolite composite catalyst. The produced hierarchical zeolite composite catalyst has a mesostructure comprising at least one disordered mesophase and at least one ordered mesophase.

According to another embodiment, a method of converting $C_{9+}$ alkyl aromatic hydrocarbons to a product stream comprising benzene, toluene, and xylene is provided. The method comprises reducing a hierarchical zeolite composite catalyst comprising a mesostructure comprising at least one disordered mesophase and at least one ordered mesophase with hydrogen gas at 400 to 500° C. The hierarchical zeolite composite catalyst comprises large pore ZSM-12 having a SiO$_2$/Al$_2$O$_3$ ratio of 20 to 300, medium pore ZSM-5 having a SiO$_2$/Al$_2$O$_3$ ratio of 5 to 500, and one or more impregnated active metals. The method further comprises contacting a feed comprising C$_{9+}$ alkylaromatic hydrocarbons with the reduced composite zeolite catalyst and hydrogen in a transalkylation zone of a reactor to produce a transalkylation product, stripping C$_1$-C$_5$ and unreacted feed from the transalkylation product, and collecting at least the xylenes product from the transalkylation product.

According to yet another embodiment, a hierarchical zeolite composite catalyst is provided. The hierarchical zeolite composite catalyst comprises a solid zeolite composite mixed with an alumina binder. The solid zeolite composite comprises a large pore ZSM-12 and a medium pore ZSM-5 in a 1:1 to 5:1 weight ratio. Further, the hierarchical zeolite composite catalyst has a mesostructure comprising at least one disordered mesophase and at least one ordered mesophase.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Figure 1:
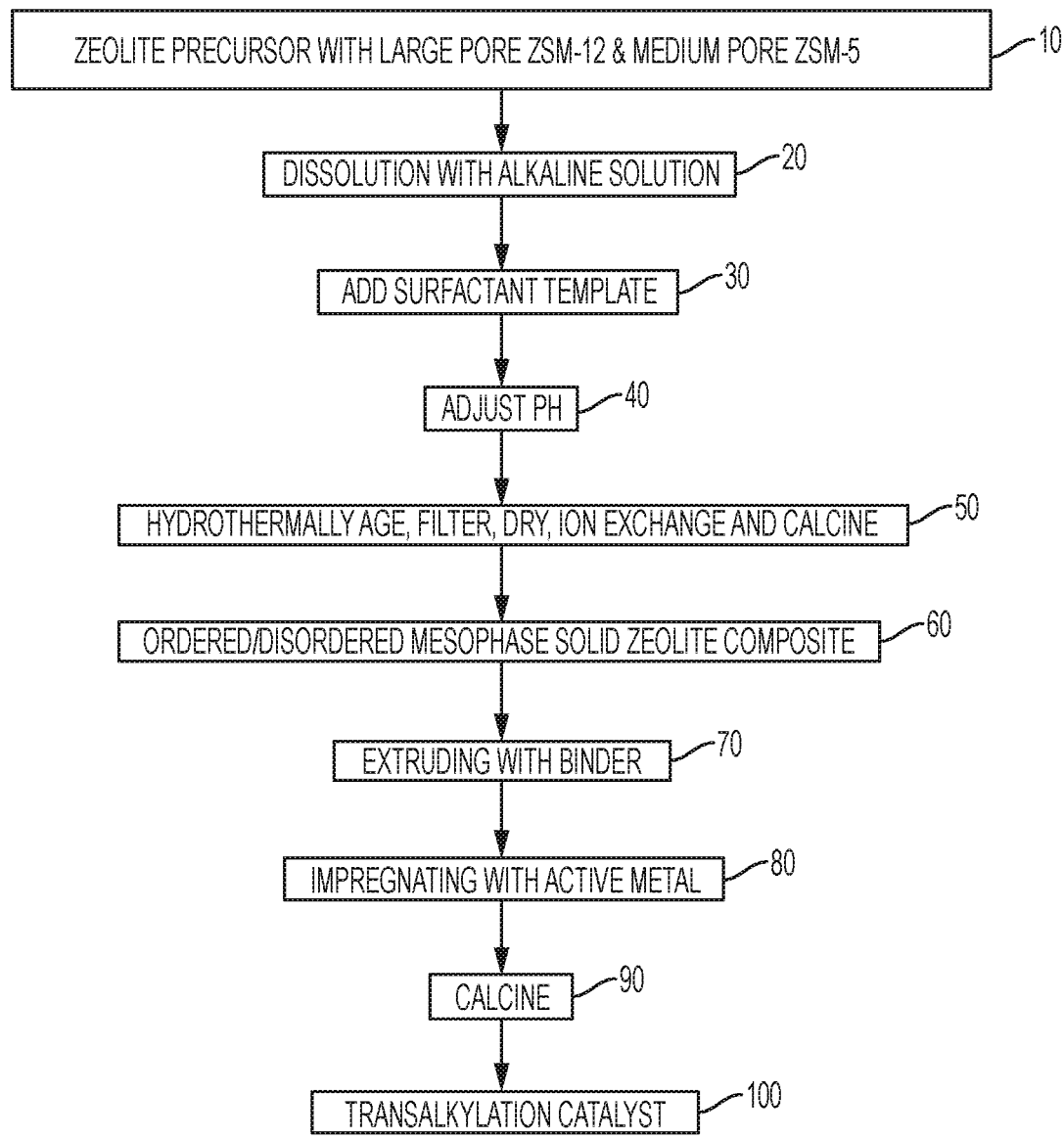
FIG. 1 is a flow chart depicting the synthesis of a zeolite composite catalyst in accordance with one or more embodiments of the present disclosure.

Reference will now be made in detail to embodiments of a hierarchical zeolite composite catalyst comprising a mesostructure comprising at least one disordered mesophase and at least one ordered mesophase. In one embodiment, the ordered mesophase is a hexagonal mesophase, and the disordered mesophase comprises a hexagonal mesophase. Without being bound by theory, hierarchical zeolite composite catalyst with ordered and disordered mesophase formation provides improved transalkylation catalyst activity, which provides improved yield of xylenes. As defined, "ordered mesophase" means a crystalline zeolite uniform arrangement of mesopores, where "mesopores" have an average pore diameter between 2 and 50 nanometers. As defined, "disordered mesophase" means a non-uniform arrangement of pores, where mesopores have an average pore diameter between 2 and 50 nanometers. As defined, "ordered/disordered phase" means the surface has a combination of at least one ordered mesophase and at least one disordered mesophase. Induction of an ordered/disordered phase into the zeolite structure increases the probability of larger molecules in a feed having access to the active sites inside the hierarchical zeolite composite catalyst. Access to these active sites allows the feed to undergo chemical transformation and decreases the requisite residence time inside the framework of the hierarchical zeolite composite catalyst helping to avoid undesirable side reactions.

Moreover, the hierarchical zeolite composite catalyst may also comprise at least one additional mesoporous zeolite, for example, selected from the group of ZSM-11, ZSM-22, ZSM-23, MFI topology zeolite, NES topology zeolite, EU-1, MAPO-36, SAPO-5, SAPO-11, SAPO-34, and SAPO-41. The amount of this at least one additional mesoporous zeolite may range from 10 to 90 weight (wt.) % of the hierarchical zeolite composite catalyst in the final dried and calcined form. In further embodiments, the amount of this at least one additional mesoporous zeolite may range from 15 to 80 wt. %, 10 to 30 wt. %, 40 to 90 wt. %, or 10 to 20 wt. % of the hierarchical zeolite composite catalyst in the final dried and calcined form.

Moreover, the hierarchical zeolite composite catalyst may be impregnated with active metals for catalysis, for example, active metals selected from the group consisting of platinum, rhenium, rhodium, molybdenum, nickel, tungsten, chromium, ruthenium, gold, and combinations thereof. In one embodiment, the active metal is molybdenum. The active metal component exists within the final hierarchical zeolite composite catalyst as an elemental metal. The metal component may exist within the final hierarchical zeolite composite catalyst as a compound, such as a metal oxide, a metal sulfide, or a metal halide, in chemical combination with one or more of the other ingredients of the hierarchical zeolite composite catalyst, or as the active elemental metal. The metal oxide may be reduced under hydrogen pressure and an elevated temperature, for example 450° C., to form the active elemental metal. The active metal component may be present in the final hierarchical zeolite composite catalyst in any amount that is catalytically effective, generally from 0.01 to 6.0 wt. %, or from 2 to 5 wt. % of the zeolite catalyst.

As described in the synthesis discussion as follows, the hierarchical zeolite composite catalyst may comprise a large pore ZSM-12 and a medium pore ZSM-5 in a 3:1 weight ratio. In further embodiments, the hierarchical zeolite composite catalyst may comprise a large pore ZSM-12 and a medium pore ZSM-5 in a 2:1 weight ratio, a 4:1 weight ratio, a 5:1 weight ratio, or a 1:1 weight ratio. In further embodiments the large pore ZSM-12 or the medium pore ZSM-5 may be provided exclusively. For conciseness of the disclosure, further discussion includes both the large pore ZSM-12 and the medium pore ZSM-5 in combination with the understanding that the large pore ZSM-12 or the medium pore ZSM-5 could be provided individually.

ZSM-12 belongs to the MTW Topology with a pore size opening of 5.7-6.1 Å. ZSM-12 may be used as a transalkylation catalyst for converting C$_{9+}$ molecules to C$_8$ molecules. Without being bound by theory, a catalyst including ZSM-12 produces more benzene as compared to other transalkylation catalysts. ZSM-12 may be more efficient in dealkylation of ethylmethylbenzenes (EMBs) to produce toluene, which is utilized for transalkylation of trimethylbenezenes (TMBs) to produce xylenes.

Without being bound by theory, ZSM-5 helps in maximizing the dealkylation reactions to produce toluene in-situ and reduce the formation of heavy molecules, which are undesired precursors for the catalyst.

In various embodiments, the large pore ZSM-12 may have a $SiO_2/Al_2O_3$ molar ratio of at least 20, of 20 to 300, of 40 to 200, of 60 to 100, or of 70 to 90. In various embodiments, the medium pore ZSM-5 may have a $SiO_2/Al_2O_3$ ratio molar ratio of at least 5, of 5 to 500, of 10 to 100, of 20 to 75, of 30 to 50, of 35 to 45, or of 38 to 42.

In one embodiment, the molar ratio of silica to alumina in the hierarchical zeolite composite catalyst is from 20 to 500. In another embodiment, the molar ratio of silica to alumina in the hierarchical zeolite composite catalyst is at least 30. Moreover, the molar ratio of silica to alumina may be from 30 to 100, or from 40 to 80. The acidity is defined by the ratio of silica to alumina groups in the particular composite catalyst. In various embodiments, the hierarchical zeolite composite catalyst has an intermediate acidity. For purposes of this disclosure, a silica to alumina molar ratio less than 20 is considered high acidity, a silica to alumina molar ratio in the range of 20 to 100 is considered intermediate acidity, and a silica to alumina molar ratio of more than 100 is considered a low acidity. Without being bound by theory, lower alumina content in the zeolite framework negatively effects the Brønsted acidity of the zeolite. The Brønsted acidity of the hierarchical zeolite composite catalyst is a key parameter driving the catalytic properties for the dealkylation and transalkylation chemistry of the feed. Hence, any reduction of the Brønsted acidity directly effects the overall performance of the hierarchical zeolite composite catalyst. Accordingly, a zeolite composite catalyst with a silica to alumina molar ratio less than 20 (e.g., having relatively low alumina content) may not perform as well as a zeolite composite catalyst with a silica to alumina molar ratio of greater than 20.

From a property standpoint, the hierarchical zeolite composite catalyst may have a surface area defined by a Brunauer-Emmett-Teller (BET) analysis (also known as the Specific Surface Area) of at least 300 meters per gram ($m^2/g$), or a BET surface area of at least 500 $m^2/g$. The BET surface area represents the total surface area of a material per unit of mass. Further, the hierarchical zeolite composite catalyst may have an external surface area of at least 300 $m^2/g$, of at least 350 $m^2/g$, of at least 400 $m^2/g$, or 400 to 600 $m^2/g$.

In one or more embodiments, the hierarchical zeolite composite catalyst may have a total pore volume of 0.20 to 3.0 cubic centimeters per gram ($cm^3/g$), or 0.30 to 1.0 $cm^3/g$. Moreover, the hierarchical zeolite composite catalyst may have a total pore volume of at least 0.30 $cm^3/g$, or of at least 0.40 $cm^3/g$, or at least 0.50 $cm^3/g$. In another embodiment, the hierarchical zeolite composite catalyst may have an average pore diameter of at least 30 angstroms (3 nanometers (nm)) or 3 nm to 3.5 nm.

Referring to FIG. 1, the method of producing the hierarchical zeolite composite catalyst may comprise the steps of providing a catalyst precursor 10 comprising a mesoporous zeolite and dissolving in an alkaline solution while heating, stirring, or both to yield a dissolved zeolite solution 20. The mesoporous zeolite may comprise a large pore ZSM-12 and a medium pore ZSM-5. In one embodiment, the catalyst precursor comprises the large pore ZSM-12 and the medium pore ZSM-5 as well as at least one additional mesoporous zeolite selected from the group consisting of ZSM-22, ZSM-11, and combinations thereof. Large pore zeolites are defined as zeolites with 12 membered rings forming the zeolite framework. Medium pore zeolites are defined as zeolites with 10 membered rings forming the zeolite framework. The combination of medium pore zeolite and large pore zeolite provide distinct reaction steps. Specifically, medium pore zeolite, such as ZSM-5, facilitates enhanced dealkylation of ethyltoluenes to produce toluene and large pore zeolites, such as ZSM-12, facilitates processing of toluene or trimethylbenezenes (TMBs) into xylenes.

The dissolving step, also called desilication, may be conducted in the presence of a surfactant 30, where the surfactant is often called a templating agent for the zeolite catalyst. While the FIG. 1 embodiment shows templating surfactant, it is contemplated in other embodiments that surfactant is absent. For example and not by way of limitation, the surfactant is a cationic surfactant. The cationic surfactant may include a quaternary ammonium compound. For example and not by way of limitation, the quaternary ammonium cationic surfactant may be cetyltrimethyl ammonium bromide (CTAB). Various amounts of surfactant are contemplated for inclusion in the catalyst precursor. For example, the catalyst precursor may include 1 wt. % to 10 wt. % surfactant, for example CTAB, or 1 wt. % to 8 wt. % surfactant, or 2 wt. % to 8 wt. % surfactant, or 3 wt. % to 6 wt. % surfactant, or 4 wt. % to 5 wt. % surfactant.

During conventional desilication, the mesoporosity in the zeolite is generated by desilication using standard conditions. For example, desilication may be performed using 0.4 Molarity (M) NaOH with 30 minutes (min) of stirring at 100° C. By this process, one third of catalyst is lost due to desilication; however, the present method utilizes that desilicated source to generate mesoporosity using the surfactant template. During a desilication process, loss in the catalyst yield generally occurs due to zeolite dissolution such that approximately 15% of the expected catalyst yield is lost. However, the present methods include recrystallization of the dissolved silica species such that the wasted silica through desilication is effectively utilized and the final yield of hierarchical zeolite composite catalyst is maintained at or near 98%.

Further as shown in FIG. 1, the dissolution may occur slowly in the presence of a surfactant template by gradual heating for 24 hours (h). The filtrate is collected and mesopores are generated using a template mediated technique. In a template mediated technique, a partially dissolved zeolite is thermally recrystallized around a selected template which dictates the pore size of the regrown structure. In this way, the unutilized desilicated source is utilized to produce the mesophases. Various heating processes or elements are contemplated. For example, the heating may be hydrothermal heating. In one or more embodiments, the hydrothermal heating may occur at a temperature of 50 to 150° C., or a temperature of 90 to 110° C. Furthermore, the duration of hydrothermal heating may range from 30 minutes to 48 hours.

Various alkaline solutions are contemplated for the desilication. In one embodiment, the alkaline solution may comprise NaOH. In specific embodiments, the alkaline solution may comprise 0.01 to 0.5M NaOH, 0.1 to 0.6M NaOH, 0.2 to 0.5M NaOH, 0.35 to 0.45M NaOH, or 0.4M NaOH. Without being bound by theory, it is surprisingly discovered that controlling the molarity of the NaOH is a parameter that impacts the ordered/disordered phase mesostructure of the hierarchical zeolite composite catalyst. It is believed the NaOH is responsible for breaking the chemical structure of the zeolites, thus a larger concentration of the NaOH leads to increased dissolution of the zeolite structure which is recrystallized in the presence of CTAB to form the mesostrucures of the hierarchical zeolite composite catalyst.

Referring again to FIG. 1, the method may comprise the step 40 of adjusting the pH of the dissolved zeolite solution. The adjustment of the pH is performed by an acidic solution.

Various acids are contemplated. In one embodiment, the acidic solution comprises sulfuric acid. In one specific embodiment, the acid is 2 Normality (N) (equivalents/liter) dilute sulfuric acid. In specific embodiments, the pH is adjusted to 8 to 10, 8.5 to 9.5, or substantially 9.0.

Next, various additional steps 50 may be utilized, for example, hydrothermal aging, filtering, washing, drying, ion-exchanging, and calcining the pH adjusted dissolved zeolite solution. The hydrothermal aging may involve maintaining the pH adjusted dissolved zeolite solution at a temperature of 75 to 125° C. for a duration of 12 to 48 hours. For example, the pH adjusted dissolved zeolite solution may be aged at 100° C. for a duration of 24 hours. During hydrothermal aging, the soluble aluminosilicate species are hydrothermally condensed to form mesophases. The condensing of the dissolved zeolite solution may be performed under still conditions or agitated conditions. Specifically, under still conditions, the dissolved zeolite solution is not stirred or mixed where conversely under agitated conditions the dissolved zeolite solution is mixed or stirred. The solid products formed from condensing the dissolved zeolite solution may be filtered to form a solid zeolite composite, washed thoroughly using distilled water, and then dried. For example, the solid zeolite composite may be dried overnight at a temperature of 100° C. The ion exchange may occur in the presence of a nitrate solution, for example and not by way of limitation, a solution comprising $NH_4NO_3$. In one or more embodiments, the solid zeolite composite is ion exchanged three times with 0.05 M $NH_4NO_3$ solution at 80° C. for 5 hours. The solid zeolite composite may be heated to remove the entrained surfactant. For example, the solid zeolite composite may be heated to 500 to 600° C. for 5 to 8 hours, 570° C. for 7 hours, or 550° C. for 6 hours to vaporize and remove the surfactant template. By stage 60 the solid composite zeolite with ordered/disordered mesophase is formed.

Referring to FIG. 1, the process may also include the step 70 of extruding the solid zeolite composite in the presence of binder. A refractory binder or matrix is optionally utilized to facilitate fabrication of the catalyst, to provide strength, and to reduce fabrication costs. Suitable binders include inorganic oxides, such as one or more of alumina, magnesia, zirconia, chromia, titania, boric, phosphate, zinc oxide, and silica. In one embodiment, the binder is an alumina based binder. One commercial embodiment of the alumina binder is Cataloid AP-3, obtained from Catalysts & Chemicals Industries Co., Ltd (CCIC), Japan. The zeolites may be mixed in dry powdered form with the alumina binder in aqueous form to yield a homogeneous mixture, thus ensuring homogeneous composition of the extrudates formed. In one or more embodiments, the ratio by weight of solid zeolite composite to binder is 4 to 1 (80 wt. % solid zeolite composite and 20 wt. % binder), 3 to 1 (75 wt. % solid zeolite composite and 24 wt. % binder), or 2 to 1 (67 wt. % solid zeolite composite and 33 wt. % binder). The extrusion with binder step 70 may be conducted at a temperature of 100 to 150° C. for a duration of 30 minutes to 2 hours.

Next, the process may comprise the step 80 of impregnating solid zeolite composite with one or more active metals prior to a calcining step. The one or more active metals are selected from the group consisting of platinum (Pt), rhenium (Re), rhodium (Rh), molybdenum (Mo), nickel (Ni), tungsten (W), chromium (Cr), ruthenium (Ru), gold (Au), and combinations thereof. In one or more embodiments, the active metals comprise 0.01 to 6.0 wt. % of the impregnated solid zeolite composite. In one embodiment, the active metal may comprise molybdenum at 2 to 6% by weight of the impregnated solid zeolite composite, including 4% by weight molybdenum. In one or more embodiments, the solid zeolite composite is impregnated with 4 wt. % of molybdenum in the form of ammonium molybdate tetrahydrate through wet impregnation. Optionally, the impregnated solid zeolite composite may be dried after wet impregnation. In one embodiment, the drying occurs for at least 2 hours at 100° C.

Referring again to FIG. 1, another calcining step 90 may be utilized to produce the hierarchical zeolite composite catalyst, which is effective as a transalkylation catalyst 100. The calcining step may occur for 4 to 8 hours at a temperature of 400 to 500° C., for 4 hours at a temperature of 400° C., for 5 hours at a temperature of 450° C.

Further as stated supra, the present hierarchical zeolite composite catalyst is a transalkylation catalyst suitable for converting $C_{9+}$ alkyl aromatic hydrocarbons to a product stream comprising benzene, toluene, and xylene, particularly to commercially valuable xylenes. The feed stream to the conversion process generally comprises alkylaromatic hydrocarbons in the carbon number range $C_9$ to $C_{11+}$ that may include, for example, such hydrocarbons as propylbenzenes, ethylmethylbenzenes, tetramethylbenzenes, ethyldimethylbenzenes, diethylbenzenes, methylpropylbenzenes, and mixtures thereof. The heavy aromatics feed stream, characterized mainly by $C_{9+}$ aromatics, permits effective transalkylation of light aromatics such as benzene and toluene with the heavier $C_{9+}$ aromatics to yield additional $C_8$ aromatics, such as xylenes. The heavy aromatics stream preferably comprises at least 90 wt. % $C_9$ aromatics, and may be derived from the same or different known refinery and petrochemical processes, and may be recycled from the separation of the product from transalkylation.

Figure 2:
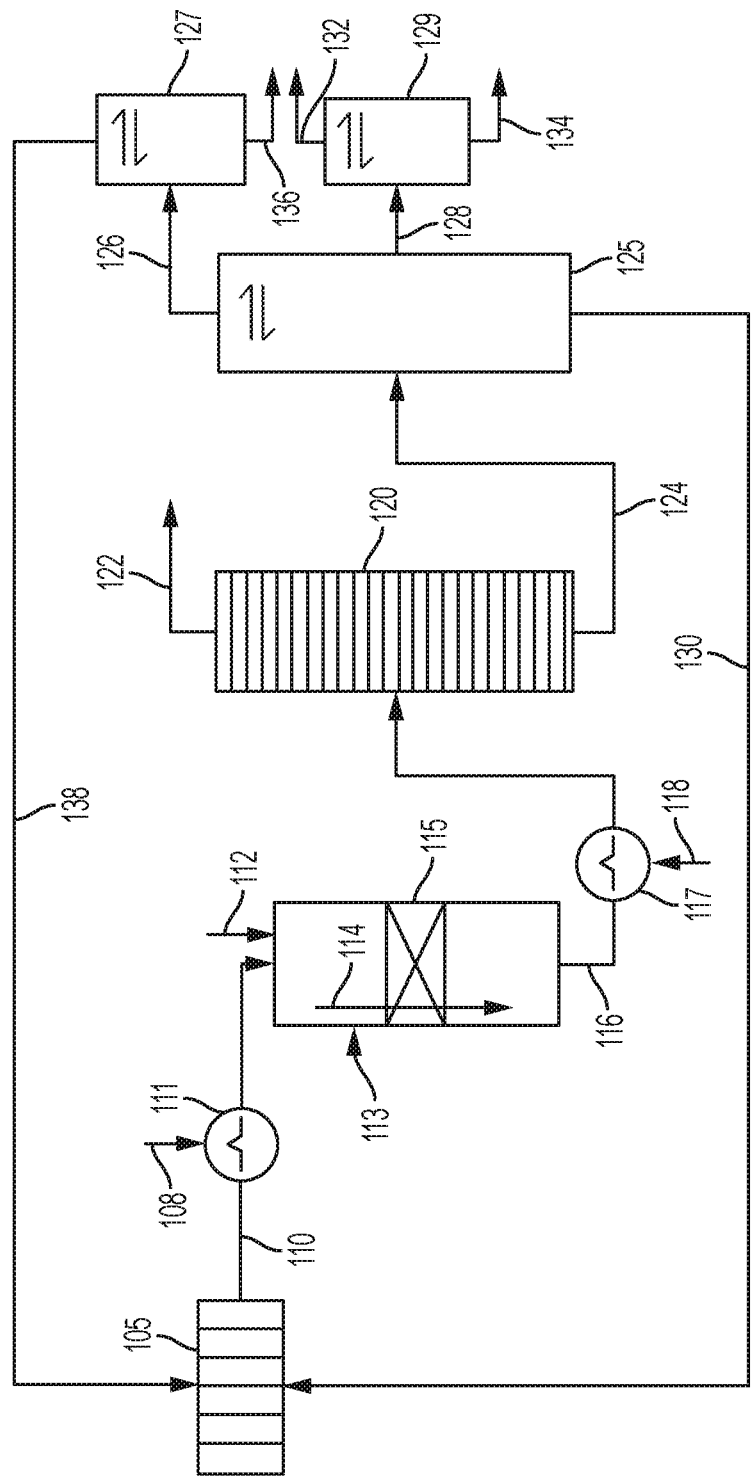
FIG. 2 is a schematic illustration depicting the conversion of heavy reformate into xylenes in accordance with one or more embodiments of the present disclosure.

Referring to the embodiment of FIG. 2, the method of using the hierarchical zeolite composite catalyst as a transalkylation catalyst may optionally include heating a feed stream 110 comprising $C_{9+}$ alkylaromatic hydrocarbons from a feed source 105 with a heater unit 111. As shown, the heater unit 111 may be a heat exchanger which receives a heated stream 108, for example, a heated water stream to heat the feed stream 110 prior to delivery to a reactor 113. The heated stream 108 may also be the effluent of the reaction zone. Other methods of heating the feed are contemplated.

The reactor system may include a reactor 113 with hierarchical zeolite composite catalyst used in transalkylation catalyst zone 115 as shown in FIG. 2, or may include multiple reactors 113 or stages. The reactor 113 is depicted as a downflow 114 reactor but that is one of many possibilities. Similarly, in the embodiment of FIG. 2, the reactor 113 has a fixed cylindrical bed of catalyst; however, other reaction configurations utilizing moving beds of catalyst, radial-flow reactors, or fluidized beds may be employed. Prior to the feed being delivered, the hierarchical zeolite composite catalyst in transalkylation catalyst zone 115 may be reduced, for example, reduced with hydrogen gas 112. In one embodiment, the hierarchical zeolite composite catalyst is reduced by hydrogen gas 112 at a temperature of 350 to 450° C., or 400° C.

Referring again to FIG. 2, the feed stream 110 contacts the reduced hierarchical composite zeolite catalyst and hydrogen 112 in the transalkylation catalyst zone 115 of the reactor 113. Specifically, the feed stream 110 is transalkylated in the vapor phase and in the presence of hydrogen 112. The hydrogen 112 may be delivered with the feed stream 110 in an amount from 0.1 to 10 moles of hydrogen per mole of alkylaromatics. This ratio of hydrogen to alkylaromatics is also referred to as the hydrogen-to-hydrocarbon ratio. The transalkylation results in the production of a transalkylation effluent stream 116 comprising product hydrocarbons, specifically, hydrocarbons having mixed xylene content, as well as unconverted feed, toluene, and benzene. Various conditions are contemplated for the reactor 113. Specifically, the transalkylation catalyst zone 115 may include a temperature between 50° C. and 600° C., 200° C. and 540° C., or 340° C. and 450° C., for example, and moderately elevated pressures of 0.5 megapascal (MPa) to 15.0 MPa, 1.0 MPa to 5.0 MPa, or 1.5 MPa to 3.5 MPa, for example. The liquid hourly space velocity (LHSV) is in the range of 1.0 hr$^{-1}$ to 3.0 hr$^{-1}$, or, 1.0 hr$^{-1}$ to 5.0 hr$^{-1}$ or 1.0 hr$^{-1}$ to 15.0 hr$^{-1}$, for example.

The transalkylation effluent stream 116 may be cooled using a cooler 117. The cooler 117 may be a heat exchanger, condenser, or any other suitable cooling device. As shown, the cooler 117 is a heat exchanger which includes a cooling stream 118. Next, the transalkylation effluent stream 116 may be fed to a stripper column 120, where $C_1$-$C_5$ and lighter hydrocarbons 122 are separated from the transalkylation effluent stream 116.

Referring to FIG. 2, the product 124 of the stripper column 120, which may be discharged from the bottom of the stripper column 120, may include a light recovery stream 126 comprising benzene and toluene, a mixed $C_8$ aromatics product 128, and a heavy recycle stream 130. These all may subsequently be separated in one or more reaction vessels 125, 127, 129. The mixed $C_8$ aromatics product 128 can be sent for recovery of p-xylene 132 and other valuable isomers 134. The light recovery stream 126 may undergo benzene and toluene recovery 136 with the remainder portion recycled as a light recycle stream 138 to the transalkylation zone or the feed source 105. The heavy recycle stream 130 may contain substantially all of the $C_9$ and heavier aromatics and may be partially or totally recycled to the transalkylation reaction zone, or delivered to the feed source 105 for recycle, or removed from the process for disposal or other processing.

EXAMPLES

The described embodiments will be further clarified by the following examples and comparative examples.

For demonstration purposes, the preparation of composite catalysts is provided as follows. The synthesis of mesoporous hierarchical Catalyst A, which includes separate treatment of ZSM-12 and ZSM-5 with NaOH followed by still crystallization in CTAB and physical mixing of the separately treated ZSM-12 and ZSM-5 in a 3:1 ratio, respectively, is presented in Example 1.

The performance of Catalyst A was compared with comparative examples representing an untreated constituent of catalyst A (untreated ZSM-12 synthesized according to a conventional procedure), an individually treated constituent of Catalyst A (treated ZSM-12 synthesized according to a conventional procedure), and a physical mixture of untreated constituents of Catalyst A (untreated ZSM-12 synthesized according to a conventional procedure and untreated commercial sample of ZSM-5 physically mixed). The performance of Catalyst A was compared with one of its constituents (untreated ZSM-12 synthesized according to a conventional procedure) in Comparative Example 2 (Catalyst B). The performance of Catalyst A was compared with one of its constituents (treated ZSM-12 synthesized according to a conventional procedure) in Comparative Example 3 (Catalyst C). The performance of Catalyst A was compared with a physical mix of untreated constituents (untreated ZSM-12 synthesized according to a conventional procedure and untreated commercial sample of ZSM-5) in Comparative Example 4 (Catalyst D).

The catalysts described in these examples are exemplary embodiments only, and are not intended to limit the general description of the composite catalyst covering this invention. In each example, the catalyst composition of Catalysts A and D comprise 48.24 wt. % ZSM-12, 16.08 wt. % ZSM-5, 31.68% binder, and 4 wt. % active metal. The catalyst composition of Catalysts B and C comprise 64.32 wt. % ZSM-12, 31.68 wt. % binder, and 4 wt. % active metal. The binder is an alumina binder (Cataloid, AP-3, obtained from Catalysts & Chemicals Industries Co., Ltd (CCIC), Japan) and the active metal is molybdenum in each example.

TABLE 1

Catalyst compositions

| Catalyst | Constituents | Treatment | Catalyst composition (wt. %) |
|---|---|---|---|
| Catalyst A (Example 1) | ZSM-12 + ZSM-5 | Separate treatment with 0.2N NaOH solution followed by still crystallization in the presence of CTAB | ZSM-12 (48.24%) ZSM-5 (16.08%) Binder (31.68%) Active Metal (4%) |
| Catalyst B (Comparative Example 2) | ZSM-12 | Untreated sample synthesized according to a conventional procedure | ZSM-12 (64.32%) Binder (31.68%) Active Metal (4%) |
| Catalyst C (Comparative Example 3) | ZSM-12 | Treatment with 0.2N NaOH solution followed by still crystallization in the presence of CTAB | ZSM-12 (64.32%) Binder (31.68%) Active Metal (4%) |
| Catalyst D (Comparative Example 4) | ZSM-12 + ZSM-5 | Untreated samples physically mixed | ZSM-12 (48.24%) ZSM-5 (16.08%) Binder (31.68%) Active Metal (4%) |

Example 1: Separate Treatment of ZSM-12 and ZSM-5 with 0.2 N NaOH Solution Followed by Still Crystallization in the Presence of CTAB In separate glass vessels, three grams of ZSM-12 ($SiO_2$/$Al_2O_3$ molar ratio=80, synthesized according to the procedure of Gopal et al., Synthesis of Al-rich ZSM-12 using TEAOH as template, Microporous and Mesoporous Materials, Volume 49, Issues 1-3, 15 Nov. 2001, Pages 149-156, which describes the hydrothermal synthesis of ZSM-12 with tetraethylammonium hydroxide (TEAOH), hereinafter "Gopal et al.") and one gram ZSM-5 ($SiO_2$/$Al_2O_3$ molar ratio=40, HSZ-840 NHA, Tosoh Chemicals, Japan), were respectively disintegrated using 0.2 M NaOH solution by gradual heating with stirring at 100° C. for 24 hours (h). The heating was carried out in the presence of CTAB (4.45 wt. %). Each mixture was cooled down and then the pH was adjusted to 9.0 through the addition of dilute sulfuric acid (2 N). Each mixture was stirred for 24 h and then aged at 100° C. for 24 h to form a solid zeolite composite of ZSM-12 and ZSM-5, respectively. The solid zeolite composites were individually filtered, washed thoroughly using distilled water, dried at 80° C. overnight, then calcined at 570° C. for 6 h to remove the surfactant (CTAB). Each solid zeolite composite (ZSM-12 and ZSM-5) thus obtained was ion-exchanged three times with 0.05 M $NH_4NO_3$ solution at 80°

C. for 5 h. The resulting meso-structured ZSM-12 and meso-structured ZSM-5 were physically mixed in a 3:1 weight ratio and made into extrudates by mixing 67 wt. % solid zeolite composite mixture (ZSM-12+ZSM-5 at 3:1 weight ratio) and 33 wt. % alumina binder (Cataloid AP-3) and then loaded with 4 wt. % of molybdenum in the form of ammonium molybdate tetrahydrate through wet impregnation. Then, the impregnated solid zeolite was calcined at 450° C. for 5 h. The resulting zeolite ZSM-12/ZSM-5 composite is designated as Example 1 (Catalyst A). Table 2 includes selected properties of Example 1 (Catalyst A).

TABLE 2

Example 1 (Catalyst A) Data

| Catalyst | BET Surface Area (m2/g) | Micropore Surface Area (m2/g) | External Surface Area (m2/g) | Total Pore Volume (cm3/g) | Micropore Volume (cm3/g) | Mesopore Volume (cm3/g) |
|---|---|---|---|---|---|---|
| Example 1 (Catalyst A) | 500 | 144.670 | 355.378 | 0.759 | 0.068 | 0.692 |

Figure 3:
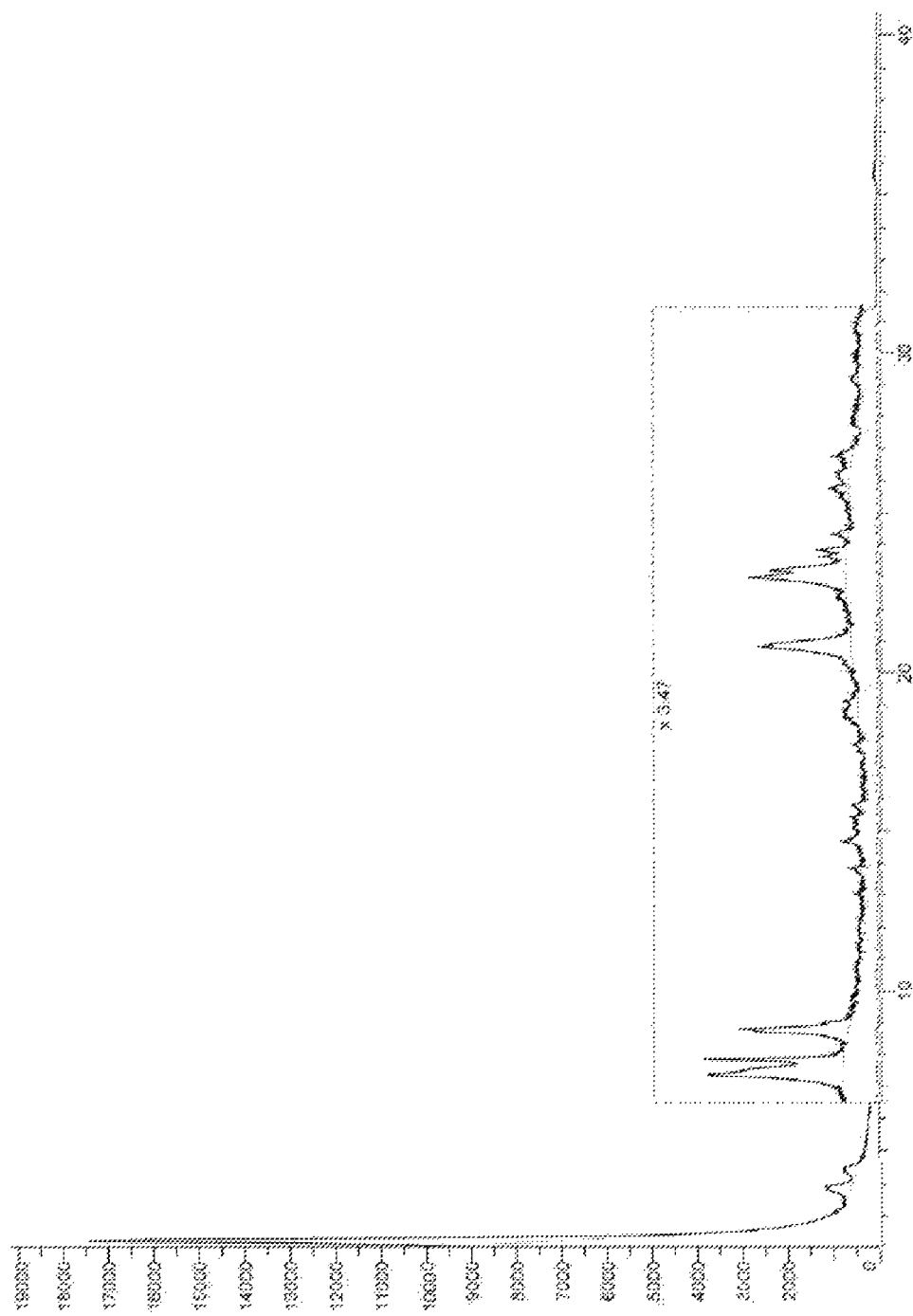
FIG. 3 is an X-Ray Diffraction (XRD) pattern of a zeolite catalyst, which was produced through the separate treatment of ZSM-12 and ZSM-5 with 0.2 N NaOH solution followed by still crystallization in the presence of CTAB.

The separate dissolution of ZSM-12 and ZSM-5 using 0.2M solution and still crystallization in the presence of CTAB leads to meso-structure formation with ordered and disordered mesophase as shown in the XRD pattern in FIG. 3.

Comparative Example 2: Synthesis of ZSM-12 According to a Conventional Procedure ZSM-12 (SiO$_2$/Al$_2$O$_3$ molar ratio=80) was synthesized according to the procedure of Gopal et al. The resulting zeolite meso-structured ZSM-12 was made into extrudates by mixing 67 wt. % ZSM-12 and 33 wt. % alumina binder (Cataloid AP-3) and then loaded with 4 wt. % of molybdenum in the form of ammonium molybdate tetrahydrate through wet impregnation. Then, the impregnated solid zeolite was calcined at 450° C. for 5 h. The resulting zeolite ZSM-12 composite is designated as Comparative Example 2 (Catalyst B). Table 3 includes selected properties of Comparative Example 2 (Catalyst B).

TABLE 3

Comparative Example 2 (Catalyst B) Data

| Catalyst | BET Surface Area (m2/g) | Micropore Surface Area (m2/g) | External Surface Area (m2/g) | Total Pore Volume (cm3/g) | Micropore Volume (cm3/g) | Mesopore Volume (cm3/g) |
|---|---|---|---|---|---|---|
| Example 2 (Catalyst B) | 301.6 | 108.800 | 192.800 | 0.472 | 0.058 | 0.414 |

Figure 4:
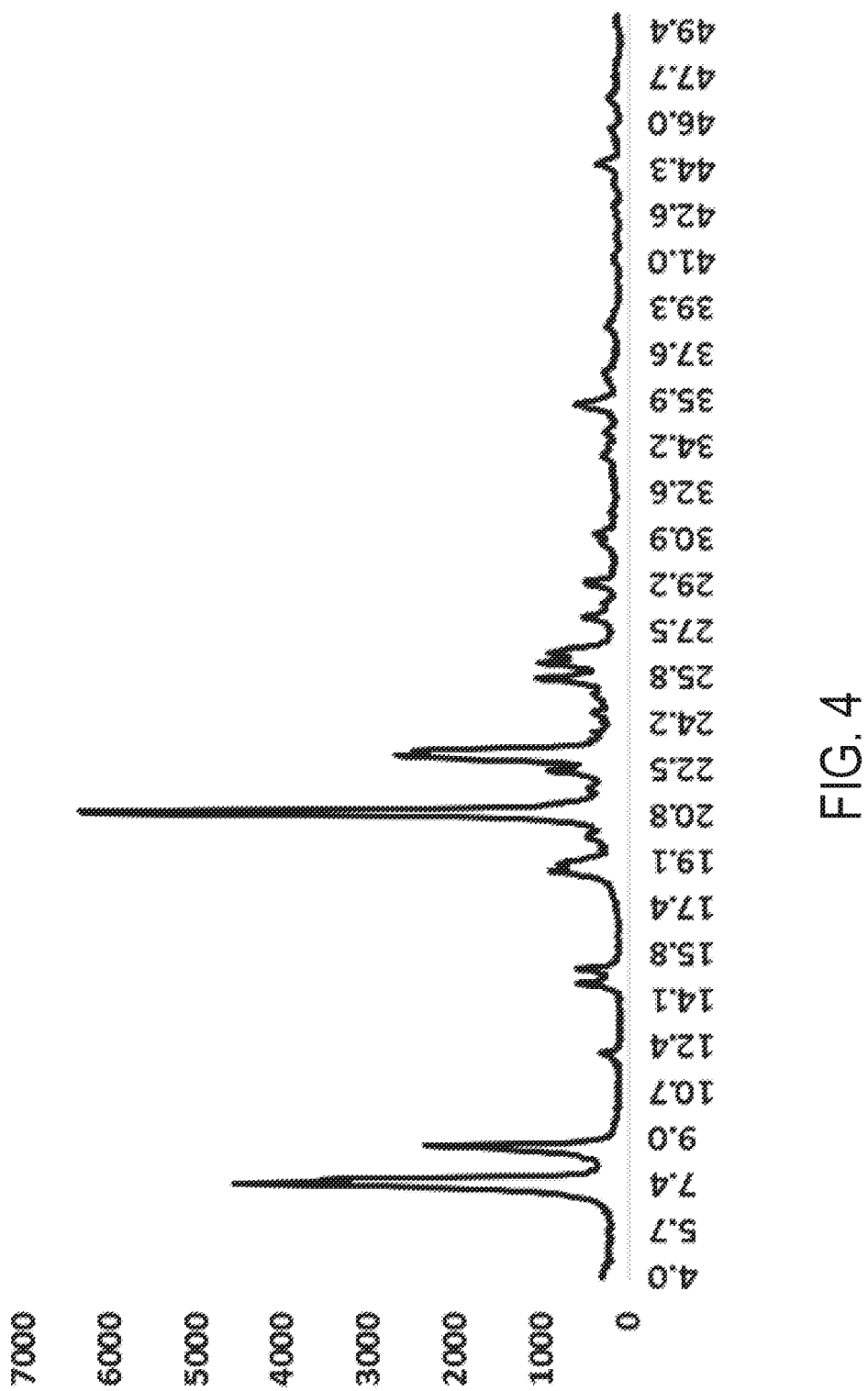
FIG. 4 is an XRD pattern of a zeolite catalyst, which was produced through the synthesis of ZSM-12 according to a conventional procedure.

The XRD pattern for Comparative Example 2 (Catalyst B) is provided in FIG. 4.

Comparative Example 3: Treatment of ZSM-12 with 0.2 M NaOH Solution Followed by Still Crystallization in the Presence of CTAB ZSM-12 (SiO$_2$/Al$_2$O$_3$ molar ratio=80, synthesized according to the procedure of Gopal et al.) was disintegrated using 0.2 M NaOH solution by gradual heating and stirring at 100° C. for 24 h. The heating was carried out in the presence of CTAB (4.45 wt. %). The mixture was cooled down and then the pH was adjusted to 9.0 through the addition of dilute sulfuric acid (2 N). The mixture was then stirred for 24 h and then aged at 100° C. for 24 to form a solid zeolite composite. The solid zeolite composite was filtered, washed thoroughly using distilled water, dried at 80° C. overnight, then calcined at 570° C. for 7 h to remove the surfactant (CTAB). The resulting zeolite-mesostructured ZSM-12 was made into extrudates by mixing 67 wt. % ZSM-12 and 33 wt. % alumina binder (Cataloid AP-3) and then loaded with 4 wt. % of molybdenum in the form of ammonium molybdate tetrahydrate through wet impregnation. Then, the impregnated solid zeolite was calcined at 450° C. for 5 h. The resulting zeolite ZSM-12 composite is designated as Comparative Example 3 (Catalyst C). Table 4 includes selected properties of Comparative Example 3 (Catalyst C).

TABLE 4

Comparative Example 3 (Catalyst C) Data

| Catalyst | BET Surface Area (m2/g) | Micropore Surface Area (m2/g) | External Surface Area (m2/g) | Total Pore Volume (cm3/g) | Micropore Volume (cm3/g) | Mesopore Volume (cm3/g) |
|---|---|---|---|---|---|---|
| Example 3 (Catalyst C) | 558 | 120.800 | 437.200 | 0.919 | 0.057 | 0.862 |

Figure 5:
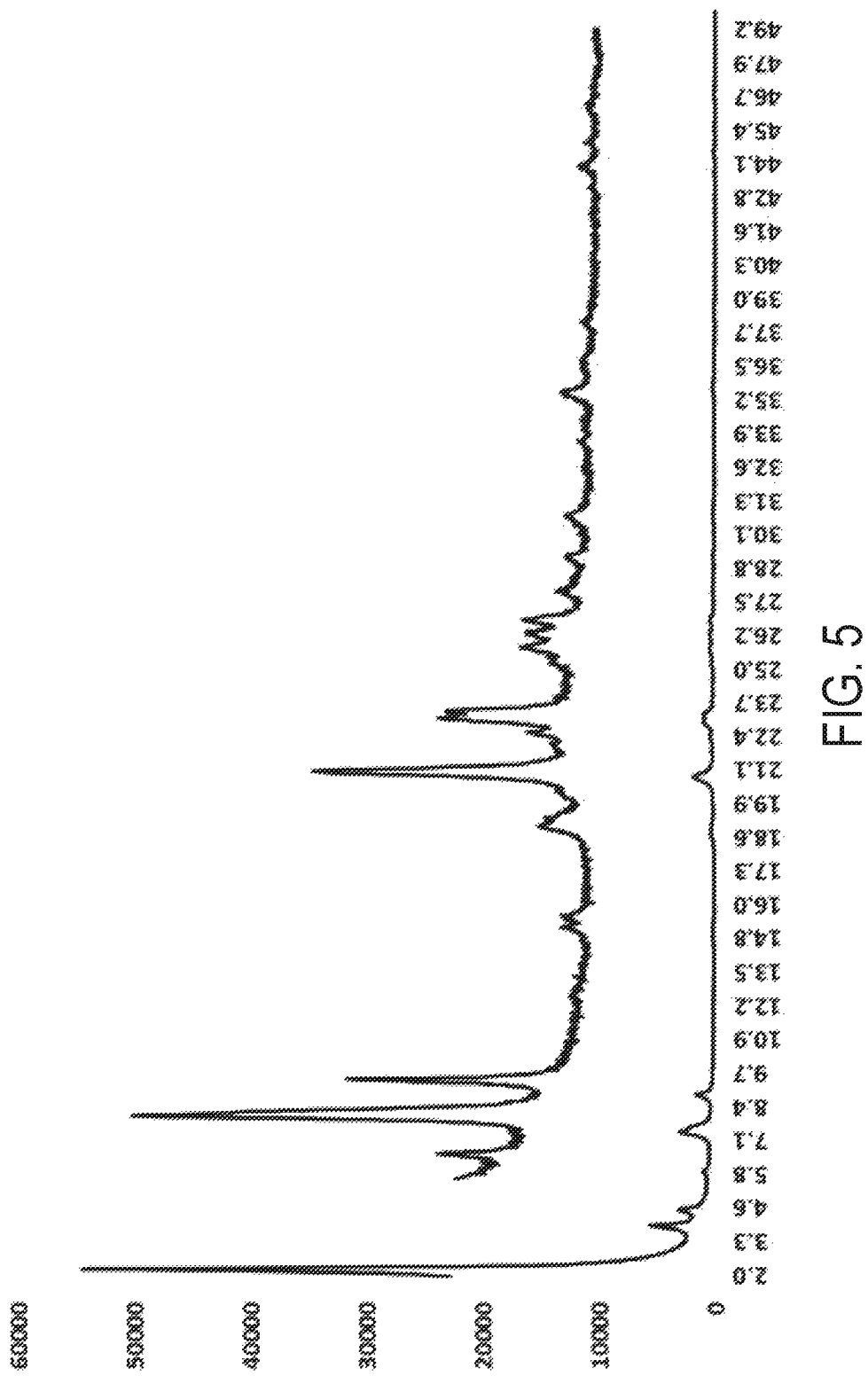
FIG. 5 is an XRD pattern of a zeolite catalyst, which was produced through the dissolution of ZSM-12 using 0.2M NaOH solution in the presence of CTAB.

The XRD pattern for Comparative Example 3 (Catalyst C) is provided in FIG. 5.

Comparative Example 4: Untreated Samples of ZSM-12 and ZSM-5 Physically Mixed

Untreated forms of ZSM-12 (SiO$_2$/Al$_2$O$_3$ molar ratio=80, synthesized according to the procedure of Gopal et al.) and ZSM-5 (SiO$_2$/Al$_2$O$_3$ molar ratio=40, HSZ-840 NHA, Tosoh Chemicals, Japan) in their ammoniated forms were physically mixed in a 3:1 weight ratio and made into extrudates by mixing 67 wt. % zeolite mixture (untreated ZSM-12+ untreated ZSM-5 in a 3:1 weight ratio) and 33 wt. % alumina binder (Cataloid AP-3) and then loaded with 4 wt. % of molybdenum in the form of ammonium molybdate tetrahydrate through wet impregnation. Then, the impregnated solid zeolite was calcined at 450° C. for 5 h. The resulting zeolite ZSM-12/ZSM-5 composite is designated as Comparative Example 4 (Catalyst D). Table 5 includes selected properties of Comparative Example 4 (Catalyst D).

TABLE 5

Comparative Example 4 (Catalyst D) Data

| Catalyst | BET Surface Area (m2/g) | Micropore Surface Area (m2/g) | External Surface Area (m2/g) | Total Pore Volume (cm3/g) | Micropore Volume (cm3/g) | Mesopore Volume (cm3/g) |
|---|---|---|---|---|---|---|
| Example 4 (Catalyst D) | 308.7 | 119.975 | 188.725 | 0.467 | 0.061 | 0.406 |

Figure 6:
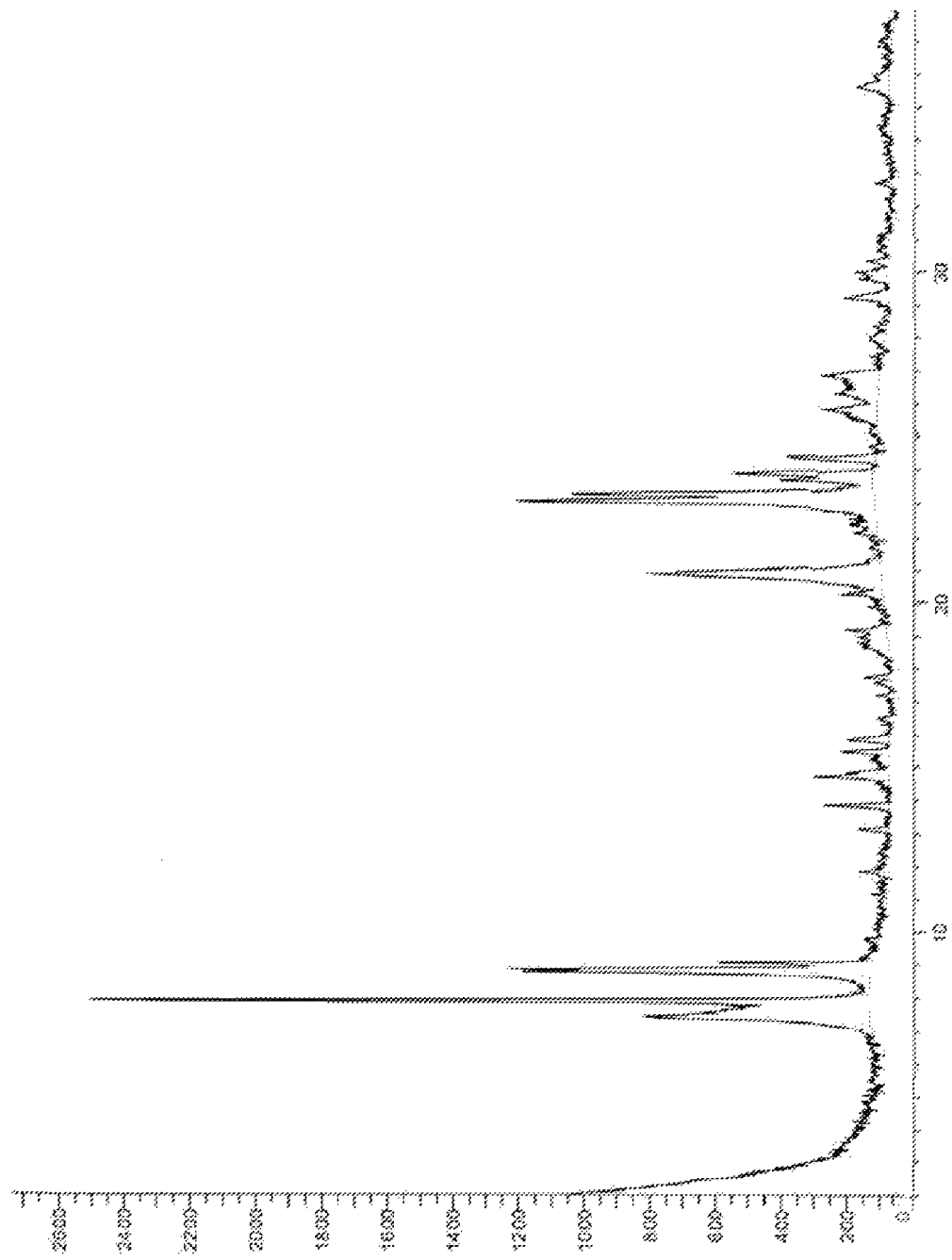
FIG. 6 is an XRD pattern of a zeolite catalyst, which was produced by physically mixing untreated samples of ZSM-12 and ZSM-5.

The XRD pattern for Comparative Example 4 (Catalyst D) is provided in FIG. 6.

TABLE 6

Heavy reformate composition

| Major Hydrocarbons | Amount (wt. %) |
|---|---|
| p-Xylene | 0.22 |
| m-Xylene | 0.52 |
| o-Xylene | 4.17 |
| n-Propylbenzene | 2.54 |
| p+m Methylethylbenzene | 16.50 |
| 1,3,5 Trimethylbenzene | 12.00 |
| o-MethylEthylbenzene | 4.62 |
| 1,2,4, Trimethylbenzene | 37.70 |
| 1,2,3 Trimethylbenzene | 6.85 |
| Total C8 Components | 4.91 |
| Total C9 Components | 80.21 |
| Total C10 Components | 8.15 |
| Total C11 Components | 6.11 |

Activity studies for Catalysts A, B, C, and D, represented in Table 1, were performed on a bench top reactor using industrial reformate feedstock (formulation provided infra in Table 6). The procedure used for determination of catalytic activity for each catalyst of Table 1 individually consisted of loading a vertical reactor with 2.0 grams of the catalyst in the isothermal zone of the reactor together with an inert silicon carbide in the lower and upper parts of the reactor. The total volume of the reactor was 100 ml. The catalyst was activated and reduced under 50 ml/min flow of pure hydrogen gas at 450° C. and was kept at this temperature for 2 hours. Then, the pressure of the reactor was increased to 20 bar and the flow of the industrial reformate feedstock was started at 4.2 grams/h. The reaction was allowed to run at least one hour at 400° C. before collecting the product sample. The reactor was allowed to further run for 300 hours without exhibiting loss of activity before termination.

The liquid product obtained from the reactor was analyzed using a gas chromatograph. The reaction product was directly injected into an on-line gas chromatograph equipped with one thermal conductivity detector (TCD) and two flame ionization detectors. The gas chromatography uses a plurality of columns to conduct the analysis of the liquid product obtained from the reactor. A Hayesep N pre-column with a 0.5 meter (m) length, a Hayesep Q column with a 1.5 m length, a CP-Wax capillary column with a 5.0 m length and 0.32 mm inner diameter, and a 13C molecular sieve with a 1.2 m length were utilized. Each column was manufactured by Agilent Technologies (Santa Clara, Calif.). The experimental results provided in Table 7 shows the comparison of the gas chromatograph liquid product analysis of Catalysts A, B, C, and D.

TABLE 7

Catalyst Experimental results

| Catalyst | Average MEB Conversion (wt. %) | Average TMB Conversion (wt. %) | Average total xylenes yield (wt. %) | Average heavy molecules (C10+) yield (wt. %) | Average ethyl-benzene yield (wt. %) |
|---|---|---|---|---|---|
| Catalyst A (Example 1) | 99.5 | 47.4 | 32.8 | 10.3 | 0.04 |
| Catalyst B (Comparative Example 2) | 84.2 | 40.9 | 27.9 | 18.9 | 0.6 |
| Catalyst C (Comparative Example 3) | 87.3 | 42 | 30.2 | 17.5 | 0.5 |
| Catalyst D (Comparative Example 4) | 97.6 | 41.6 | 32 | 14.6 | 0.1 |

Table 7 allows for the determination of effect of the meso-structured ZSM-12 and ZSM-5. Catalyst B (Comparative Example 2) represents ZSM-12 synthesized according a conventional procedure as described hereinabove. Catalyst B (Comparative Example 2) resulted in an average methylethylbenzenes (MEBs) conversion of 84.2 wt. % and an average trimethylbenzenes (TMBs) conversion of 40.9 wt. %. As a result of these conversions, Catalyst B (Comparative Example 2) resulted in a 27.9 wt. % xylenes yield, a 18.9 wt. % $C_{10+}$ yield, and a 0.6 wt. % ethylbenzene yield. While not being bound by theory heavy molecules ($C_{10+}$) are mostly aromatic in nature and potentially act as coke precursors, deactivate the catalyst performance, and significantly reduce the lifetime of the catalyst. Moreover, in industrial product plants, ethylbenzene, may act as an impurity in the fractionated xylenes because of the close boiling points of these components, which negatively contributes to the product quality and pricing of the xylenes.

In order to reduce the unwanted components like $C_{10+}$ molecules and ethylbenzene, the pore structure of ZSM-12 was modified through introduction of mesoporosity as described hereinabove to produce Catalyst C (Comparative Example 3). While not being bound by theory, the mesopores facilitate higher throughput and increase the active site accessibility. Catalyst C (Comparative Example 3) exhibited marginal improvement in methylethylbenzenes (MEBs) and trimethylbenzenes (TMBs) conversions as compared to Catalyst B (Comparative Example 2) with average conversions of 87.3 wt. % and 42 wt. %, respectively. The conversions of Catalyst C (Comparative Example 3) resulted in a xylene yield of 30.2 wt. %, which is a 2.3 wt. % increase as compared to Catalyst B (Comparative Example 2). The yields of $C_{10+}$ heavy molecules and ethylbenzene resulting from Catalyst C (Comparative Example 3) were marginally decreased to 17.5 wt. % and 0.5 wt. %, respectively, as compared to Catalyst B (Comparative Example 2).

Catalyst D (Comparative Example 4) represents a physical mix of untreated samples of ZSM-12 and ZSM-5 in a 3:1 ratio weight ratio as described hereinabove. Catalyst D (Comparative Example 4) exhibited an improved methylethylbenzenes conversion of 97.6 wt. % as compared to Catalyst C (Comparative Example 3). However, Catalyst D (Comparative Example 4) did not have an improved trimethylbenezene conversion as compared to Catalyst C (Comparative Example 3). Catalyst D (Comparative Example 4) resulted in a xylene yield of 32 wt. %, which is a 1.8 wt. % increase as compared to Catalyst C (Comparative Example 3). The yields of $C_{10+}$ heavy molecules and ethylbenzene resulting from Catalyst D (Comparative Example 4) were 14.6 wt. % and 0.1 wt. %, respectively, which are further reductions as compared to Catalyst C (Comparative Example 3).

Catalyst A (Example 1) represents a 3:1 physical mix of separately treated ZSM-12 and ZSM-5 with 0.2 N NaOH and recrystallized using CTAB as described hereinabove. Catalyst A (Example 1) had the largest methylethylbenzenes and trimethylbenzenes conversions of 99.5 wt. % and 47.4 wt. %, respectively, as compared to Catalyst B (Comparative Example 2), Catalyst C (Comparative Example 3), and Catalyst D (Comparative Example 4). The xylenes yield of Catalyst D was marginally improved to 32.8 wt. % as compared to Catalyst B (Comparative Example 2), Catalyst C (Comparative Example 3), and Catalyst D (Comparative Example 4). However, the $C_{10+}$ heavy molecules yield surprisingly decreased to 10.3 wt. % and the ethylbenzene yield decreased to almost negligible at 0.04 wt. %.

It should now be understood that the various aspects of the hierarchical composite zeolite catalysts, the methods of producing a hierarchical zeolite composite, and the methods of converting $C_{9+}$ alkyl aromatic hydrocarbons to a product stream comprising benzene, toluene, and xylene using the same are described and such aspects may be utilized in conjunction with various other aspects.

In a first aspect, the disclosure provides a method of producing a hierarchical zeolite composite catalyst. The method comprises dissolving, in an alkaline solution and in the presence of a surfactant, a catalyst precursor comprising mesoporous zeolite while heating, stirring, or both to yield a dissolved zeolite solution, where the mesoporous zeolite comprises large pore ZSM-12 having a $SiO_2/Al_2O_3$ ratio of 20 to 300 and medium pore ZSM-5 having a $SiO_2/Al_2O_3$ ratio of 5 to 500, where a ratio of ZSM-12 to ZSM-5 is 1:1 to 5:1 by weight. The method further comprises condensing the dissolved zeolite solution to yield a solid zeolite composite from the dissolved zeolite solution, where condensing the dissolved zeolite solution comprises adjusting a pH of the dissolved zeolite solution and aging the pH adjusted dissolved zeolite solution. The method yet further comprises heating the solid zeolite composite to remove the surfactant; impregnating the solid zeolite composite with one or more active metals selected from the group consisting of platinum, rhenium, rhodium, molybdenum, nickel, tungsten, chromium, ruthenium, gold, and combinations thereof to yield impregnated solid zeolite composite; and calcining the impregnated solid zeolite composite to produce the hierarchical zeolite composite catalyst. The produced hierarchical zeolite composite catalyst has a mesostructure comprising at least one disordered mesophase and at least one ordered mesophase.

In a second aspect, the disclosure provides the method of the first aspect, in which the method further comprises extruding the solid zeolite composite with binder.

In a third aspect, the disclosure provides the method of the second aspect, in which the binder is an alumina based binder.

In a fourth aspect, the disclosure provides the method of any of the first through third aspects, in which the ZSM-12 comprises pores formed from 12 membered rings forming a framework of the zeolite and the ZSM-5 comprises pores formed from 10 membered rings forming the framework of the zeolite.

In a fifth aspect, the disclosure provides the method of any of the first through fourth aspects, in which the ordered mesophase is a hexagonal mesophase.

In a sixth aspect, the disclosure provides the method of any of the first through fifth aspects, in which the aging involves maintaining the pH adjusted dissolved zeolite solution at a temperature of 75 to 125° C. for a duration of 12 to 48 hours.

In a seventh aspect, the disclosure provides the method of any of the first through sixth aspects, in which the ZSM-12 has a $SiO_2/Al_2O_3$ ratio of 60 to 100 and the ZSM-5 has a $SiO_2/Al_2O_3$ ratio of 20 to 75.

In an eighth aspect, the disclosure provides the method of any of the first through seventh aspects, in which a ratio of ZSM-12 to ZSM-5 is 3:1 by weight.

In a ninth aspect, the disclosure provides the method of any of the first through eighth aspects, in which the method further comprises ion exchanging the solid zeolite composite.

In a tenth aspect, the disclosure provides the method of any of the first through ninth aspects, in which the surfactant is cetyltrimethyl ammonium bromide which comprises 1 to 8 wt. % of the dissolved zeolite solution.

In an eleventh aspect, the disclosure provides the method of any of the first through tenth aspects, in which the catalyst precursor further comprises at least one additional mesoporous zeolite selected from the group consisting of ZSM-22, ZSM-11, and combinations thereof.

In a twelfth aspect, the disclosure provides the method of any of the first through eleventh aspects, in which the adjusting of the pH is performed by an acidic solution to adjust the pH to less than 9.

In a thirteenth aspect, the disclosure provides the method of any of the first through twelfth aspects, in which the zeolite composite catalyst has a pore volume ranging from 0.2 to 3.0 $cm^3/g$.

In a fourteenth aspect, the disclosure provides the method of any of the first through thirteenth aspects, in which a molar ratio of silica to alumina in the zeolite composite catalyst is from 20 to 500.

In a fifteenth aspect, the disclosure provides the method of any of the first through fourteenth aspects, in which the active metals comprises 0.01 to 6.0 wt. % of the impregnated solid zeolite composite.

In a sixteenth aspect, the disclosure provides the method of any of the first through fifteenth aspects, in which the alkaline solution is a 0.1 to 0.6 M NaOH solution.

In a seventeenth aspect, the disclosure provides a method of converting $C_{9+}$ alkyl aromatic hydrocarbons to a product stream comprising benzene, toluene, and xylene. The method comprises reducing a hierarchical zeolite composite catalyst comprising a mesostructure comprising at least one disordered mesophase and at least one ordered mesophase with hydrogen gas at 400 to 500° C. The hierarchical zeolite composite catalyst comprises large pore ZSM-12 having a $SiO_2/Al_2O_3$ ratio of 20 to 300, medium pore ZSM-5 having a $SiO_2/Al_2O_3$ ratio of 5 to 500, and one or more impregnated active metals. The method further comprises contacting a feed comprising $C_{9+}$ alkylaromatic hydrocarbons with the reduced composite zeolite catalyst and hydrogen in a transalkylation zone of a reactor to produce a transalkylation product, stripping $C_1$-$C_5$ and unreacted feed from the transalkylation product, and collecting at least the xylenes product from the transalkylation product.

In an eighteenth aspect, the disclosure provides the method of the seventeenth aspect, in which the transalkylation zone is at a pressure between 1.0 to 3.0 MPa, a temperature of 200° C. to 500° C., a space velocity of 1.0 to 5.0 $h^{-1}$, and a hydrogen to hydrocarbon ratio of 1 to 4.

In a nineteenth aspect, the disclosure provides the method of the seventeenth or eighteenth aspects, in which the one or more active metals are selected from the group consisting of platinum, rhenium, rhodium, molybdenum, nickel, tungsten, chromium, ruthenium, gold, and combinations thereof.

In a twentieth aspect, the disclosure provides a hierarchical zeolite composite catalyst. The hierarchical zeolite composite catalyst comprises a solid zeolite composite mixed with an alumina binder. The solid zeolite composite comprises a large pore ZSM-12 and a medium pore ZSM-5 in a 1:1 to 5:1 weight ratio. Further, the hierarchical zeolite composite catalyst has a mesostructure comprising at least one disordered mesophase and at least one ordered mesophase.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

Throughout this disclosure ranges are provided. It is envisioned that each discrete value encompassed by the ranges are also included. Additionally, the ranges which may be formed by each discrete value encompassed by the explicitly disclosed ranges are equally envisioned.

What is claimed is:

1. A method of producing a hierarchical zeolite composite catalyst comprising:
   dissolving, in an alkaline solution and in the presence of a surfactant, a catalyst precursor comprising zeolite while heating, stirring, or both to yield a dissolved zeolite solution, where the zeolite comprises ZSM-12 having a $SiO_2/Al_2O_3$ ratio of 20 to 300 and ZSM-5 having a $SiO_2/Al_2O_3$ ratio of 5 to 500, where a ratio of ZSM-12 to ZSM-5 is 1:1 to 5:1 by weight and where the alkaline solution is a 0.1 to 0.6 M NaOH solution;
   condensing the dissolved zeolite solution to yield a solid zeolite composite from the dissolved zeolite solution, where condensing the dissolved zeolite solution comprises:
   adjusting a pH of the dissolved zeolite solution; and
   aging the pH adjusted dissolved zeolite solution;
   heating the solid zeolite composite to remove the surfactant;
   impregnating the solid zeolite composite with one or more active metals selected from the group consisting of platinum, rhenium, rhodium, molybdenum, nickel, tungsten, chromium, ruthenium, gold, and combinations thereof to yield impregnated solid zeolite composite; and
   calcining the impregnated solid zeolite composite to produce the hierarchical zeolite composite catalyst, where the hierarchical zeolite composite catalyst has a mesostructure comprising at least one disordered mesophase and at least one ordered mesophase.

2. The method of claim 1 further comprising extruding the solid zeolite composite with binder.

3. The method of claim 2 where the binder is an alumina based binder.

4. The method of claim 1 where the ordered mesophase is a hexagonal mesophase.

5. The method of claim 1 where the aging involves maintaining the pH adjusted dissolved zeolite solution at a temperature of 75 to 125° C. for a duration of 12 to 48 hours.

6. The method of claim 1 where the ZSM-12 has a $SiO_2/Al_2O_3$ molar ratio 60 to 100 and the ZSM-5 has a $SiO_2/Al_2O_3$ molar ratio of 20 to 75.

7. The method of claim 1 where the ratio of ZSM-12 to ZSM-5 is 3:1 by weight.

8. The method of claim 1 further comprising ion exchanging the solid zeolite composite.

9. The method of claim 1 where the surfactant is cetyltrimethyl ammonium bromide and the dissolved zeolite solution comprises 1 to 8 wt. % of the cetyltrimethyl ammonium bromide.

10. The method of claim 1 where the adjusting of the pH is performed by an acidic solution to adjust the pH to less than 9.

11. The method of claim 1 where the zeolite composite catalyst has a pore volume ranging from 0.2 to 3.0 $cm^3/g$.

12. The method of claim 1 where a molar ratio of silica to alumina in the zeolite composite catalyst is from 20 to 500.

13. The method of claim 1 where the active metals comprises 0.01 to 6.0 wt. % of the impregnated solid zeolite composite.

* * * * *